United States Patent
Kim et al.

(10) Patent No.: US 11,492,002 B2
(45) Date of Patent: Nov. 8, 2022

(54) ELECTRONIC DEVICE ATTACHED TO VEHICLE AND CONTROL METHOD THEREFOR

(71) Applicant: Samsung Electronics Co., Ltd., Suwon-si (KR)

(72) Inventors: Jaewon Kim, Suwon-si (KR); Sunhee Youm, Suwon-si (KR); Beomseok Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 16/757,280

(22) PCT Filed: Jan. 7, 2019

(86) PCT No.: PCT/KR2019/000200
§ 371 (c)(1),
(2) Date: Apr. 17, 2020

(87) PCT Pub. No.: WO2019/139311
PCT Pub. Date: Jul. 18, 2019

(65) Prior Publication Data
US 2021/0188300 A1  Jun. 24, 2021

(30) Foreign Application Priority Data
Jan. 9, 2018 (KR) .................. 10-2018-0002834

(51) Int. Cl.
*B60W 50/14* (2020.01)
*B60W 40/04* (2006.01)
(Continued)

(52) U.S. Cl.
CPC .......... *B60W 50/14* (2013.01); *B60W 40/04* (2013.01); *B60W 40/09* (2013.01); *G07C 5/008* (2013.01);
(Continued)

(58) Field of Classification Search
CPC ...... B60W 50/14; B60W 40/04; B60W 40/09; B60W 2050/146; B60W 2556/65; G07C 5/008
See application file for complete search history.

(56) References Cited

U.S. PATENT DOCUMENTS 6,838,980 B2 *  1/2005  Gloger .................. B60R 21/013
                                                    340/435
7,079,927 B1     7/2006  Tano et al.
(Continued)

FOREIGN PATENT DOCUMENTS

CN    101872559 A    10/2010
JP    4499319 B2     7/2010
(Continued)

OTHER PUBLICATIONS

I. Elleuch, A. Makni, R. Bouaziz Cooperative Intersection Collision Avoidance Persistent System Based on V2V Communication and Real-Time Databases. 2017 IEEE/ACS 14th International Conference on Computer Systems and Applications pp. 1082-1089. (Year: 2017).*

*Primary Examiner* — Russell Frejd
*Assistant Examiner* — Tanya C Sienko
(74) *Attorney, Agent, or Firm* — Jefferson IP Law, LLP (57) ABSTRACT

An electronic device attached to a vehicle and a control method therefor are disclosed. A control method for an electronic device attached to a vehicle according to the present invention comprises the steps of: acquiring driving information from a sensor included in a vehicle while the vehicle is running; determining a dangerous event having occurred while the vehicle is running, on the basis of the acquired driving information; and providing an image associated with the determined dangerous event, on the basis of information associated with the determined dangerous event from among the driving information. Accordingly, an elec-
(Continued)

tronic device attached to a vehicle provides an image relating to a situation in which a dangerous event is expected to occur, on the basis of detected driving information. Through the provided image, a vehicle driver can develop safe driving habits.

11 Claims, 9 Drawing Sheets

(51) Int. Cl.
*B60W 40/09* (2012.01)
*G07C 5/00* (2006.01)

(52) U.S. Cl.
CPC ... *B60W 2050/146* (2013.01); *B60W 2556/65* (2020.02)

(56) References Cited

U.S. PATENT DOCUMENTS

| | | | | |
|---|---|---|---|---|
| 9,373,203 B1* | 6/2016 | Fields | | B60W 40/09 |
| 9,494,439 B1* | 11/2016 | Ross | | G05D 1/0287 |
| 10,699,347 B1* | 6/2020 | Slusar | | G01C 21/3461 |
| 10,720,080 B1* | 7/2020 | Fields | | G09B 19/14 |
| 10,977,956 B1* | 4/2021 | Madison | | G09B 9/052 |
| 2004/0064234 A1* | 4/2004 | Okamoto | | G01C 21/00 701/70 |
| 2005/0080558 A1* | 4/2005 | Kasai | | G01C 21/3492 701/423 |
| 2008/0309468 A1* | 12/2008 | Greene | | G08G 1/165 340/436 |
| 2009/0312945 A1* | 12/2009 | Sakamoto | | G01C 21/3697 701/532 |
| 2013/0224721 A1* | 8/2013 | Gilling | | G09B 19/16 434/373 |
| 2014/0320655 A1* | 10/2014 | Kim | | H04N 7/183 348/148 |
| 2014/0330576 A1* | 11/2014 | Bauer | | G16H 40/67 705/2 |
| 2015/0220794 A1* | 8/2015 | Baba | | G06T 7/254 382/103 |
| 2015/0248836 A1* | 9/2015 | Alselimi | | G01S 19/14 348/149 |
| 2017/0050590 A1 | 2/2017 | List et al. | | |
| 2017/0094227 A1* | 3/2017 | Williams | | H04N 13/271 |
| 2017/0217429 A1* | 8/2017 | Shioe | | B60W 30/08 |
| 2017/0291544 A1* | 10/2017 | Ishihara | | G06F 3/0304 |
| 2017/0357866 A1* | 12/2017 | Welland | | B60R 1/00 |
| 2018/0090011 A1* | 3/2018 | Morel | | B60K 37/06 |
| 2019/0001987 A1* | 1/2019 | Kim | | B60W 40/02 |
| 2019/0082099 A1* | 3/2019 | Imomoto | | G01C 21/26 |
| 2019/0163181 A1* | 5/2019 | Liu | | G05D 1/0088 |
| 2019/0193659 A1* | 6/2019 | Miyazawa | | G08G 1/00 |
| 2020/0231177 A1* | 7/2020 | Ferzli | | G06F 16/9038 |
| 2020/0234571 A1* | 7/2020 | Narihira | | G08G 1/09 |
| 2020/0334928 A1* | 10/2020 | Bourke | | G06N 5/04 |

FOREIGN PATENT DOCUMENTS

| | | | |
|---|---|---|---|
| JP | 2012190398 A | * | 10/2012 |
| JP | 5076592 B2 | | 11/2012 |
| JP | 5533626 B2 | | 6/2014 |
| KR | 10-1247870 B1 | | 3/2013 |
| KR | 10-2014-0083609 A | | 7/2014 |
| KR | 10-1577415 B1 | | 12/2015 |
| KR | 10-1617349 B1 | | 5/2016 |
| KR | 10-2016-0076318 A | | 6/2016 |
| KR | 10-2017-0022521 A | | 3/2017 |
| KR | 101798053 B1 | * | 11/2017 |

* cited by examiner

ELECTRONIC DEVICE ATTACHED TO VEHICLE AND CONTROL METHOD THEREFOR

TECHNICAL FIELD

The disclosure relates to an electronic device attached to a vehicle and a control method therefor, and more particularly, to an electronic device attached to a vehicle for safe driving of a user, and a control method therefor.

BACKGROUND ART

An electronic device installed inside a vehicle provides a moving path to a destination that a driver requested.

In addition, an electronic device installed inside a vehicle detects a driving situation while the vehicle is running, and predicts the possibility of occurrence of a dangerous event such as a traffic accident based on various kinds of sensing information detected.

Afterwards, the electronic device may provide information for prevention of an accident for a predicted dangerous event, or control the operation of the driver's vehicle for prevention of an accident with respect to the predicted dangerous event.

For example, in case a dangerous event like the driver's vehicle getting close to an adjacent vehicle, or moving out of the driving lane is detected, the electronic device provides an alarming message with respect to the dangerous event to the driver.

As another example, in case a dangerous event wherein the driver's vehicle gets close to the vehicle in front is detected, the electronic vehicle may control the speed of the driver's vehicle such that the vehicle can maintain a predetermined threshold distance from the vehicle in front.

That is, the electronic device monitors the current driving situation and predicts occurrence of a dangerous event, and provides an alarming message in accordance thereto or controls the vehicle.

However, for minimizing occurrence of a dangerous event as above, a driver's safe driving habit should take precedence. Accordingly, a method for developing a driver's safe driving habit should be pursued.

DETAILED DESCRIPTION OF THE INVENTION

Technical Problem

The disclosure was devised for addressing the aforementioned need, and the purpose of the disclosure is in making a driver develop a proper driving habit.

Technical Solution

A control method for an electronic device attached to a vehicle according to an embodiment of the disclosure for achieving the aforementioned purpose includes the steps of acquiring driving information from a sensor included in the vehicle while the vehicle is running, determining a dangerous event having occurred while the vehicle is running, on the basis of the acquired driving information, and providing an image associated with the determined dangerous event, on the basis of information associated with the determined dangerous event from among the driving information.

Also, in the determining step, in case the driving condition of the vehicle satisfies a predetermined condition on the basis of the driving information, it may be determined that the dangerous event occurred.

In addition, the driving information includes driving images which photographed running scenes of the vehicle. Also, in the providing step, an image associated with the dangerous event may be provided, on the basis of an image at the time point when the dangerous event occurred among the driving images.

Further, in the providing step, a simulation image expressing the situation of the time point when the dangerous event occurred may be generated on the basis of at least one of the location information, direction information, speed information, or time information of the vehicle included in the driving information, and the image may be provided.

Also, in the providing step, traffic information associated with the dangerous event and information on safe driving may be provided together while providing the image associated with the dangerous event.

In addition, the control method may further include the step of transmitting at least one of the image or the traffic information associated with the dangerous event to a traffic management server.

Also, the control method may further include the step of classifying the image associated with the dangerous event by a predetermined category. Further, in the providing step, if a user command is input, an image categorized in a category corresponding to the user command may be provided.

In addition, the control method may further include the step of determining a driving habit of the driver of the vehicle on the basis of the acquired driving information. Also, in the providing step, guide information on the driving habit associated with the dangerous event may be provided together while providing an image associated with the dangerous event.

Further, the control method may further include the step of receiving driving information from an electronic device of an adjacent vehicle. Also, in the determining step, a dangerous event may be determined on the basis of the driving information acquired from the vehicle and the driving information received from the electronic device of the adjacent vehicle.

In addition, in the receiving step, in case a condition associated with the dangerous event is detected, driving information may be received from the electronic device of the adjacent vehicle.

Meanwhile, according to another embodiment of the disclosure, an electronic device attached to a vehicle includes a display part, a sensor part acquiring driving information detected while the car was running, and a processor configured to determine a dangerous event that occurred while the car was running on the basis of the driving information acquired from the sensor part, and control the display part to display an image associated with the determined dangerous event, on the basis of information associated with the determined dangerous event from among the driving information.

Also, the processor may, based on the driving condition of the vehicle satisfying a predetermined condition on the basis of the driving information, determine that the dangerous event occurred.

In addition, the driving information includes driving images which photographed running scenes of the vehicle. Also, the processor may control the display part to display an image associated with the dangerous event, on the basis of an image at the time point when the dangerous event occurred among the driving images.

Further, the processor may generate a simulation image expressing the situation of the time point when the dangerous event occurred on the basis of at least one of the location information, direction information, speed information, or time information of the vehicle included in the driving information, and control the display part to display the generated simulation image.

Also, the processor may control the display part to display traffic information associated with the dangerous event and information on safe driving together while providing the image associated with the dangerous event.

In addition, the electronic device attached to a vehicle may further include a communicator, and the processor may control the communicator to transmit at least one of the image or the traffic information associated with the dangerous event to a traffic management server.

Also, the processor may classify the image associated with the dangerous event by a predetermined category, and if a user command is input, the processor may control the display part to display an image categorized in a category corresponding to the user command.

Further, the processor may determine the driving habit of the driver of the vehicle on the basis of the acquired driving information. Also, the processor may control the display part to display guide information on a driving habit associated with the dangerous event together while providing an image associated with the dangerous event.

In addition, the electronic device attached to a vehicle may further include a communicator, and the processor may, based on receiving driving information from the electronic device of the adjacent vehicle, determine a dangerous event on the basis of the received driving information and the driving information acquired from the vehicle.

Also, the processor may, based on detecting a condition associated with the dangerous event, receive driving information from the electronic device of the adjacent vehicle through the communicator.

Effect of the Invention

According to the various embodiments of the disclosure as described above, an electronic device attached to a vehicle according to the disclosure provides an image relating to a situation in which a dangerous event is expected to occur, on the basis of detected driving information. Through the provided image, a vehicle driver can develop safe driving habits.

BEST MODE FOR IMPLEMENTING THE INVENTION

Before describing the disclosure in detail, the description format of this specification and the drawings will be described.

First, as terms used in this specification and the claims, general terms were selected, in consideration of the functions described in the various embodiments of the disclosure. However, the terms may vary depending on the intention of those skilled in the art, legal or technical interpretation or emergence of new technologies. Also, there are some terms that were arbitrarily designated by the applicant, and the meaning of such terms may be interpreted as defined in this specification. Terms that are not specifically defined in the disclosure may be interpreted based on the overall content of this specification and common technical knowledge in the pertinent art.

Also, the same reference numerals or symbols described in each drawing accompanying this specification refer to components or elements substantially performing the same functions. For the convenience of explanation and understanding, the components or elements will be described by using the same reference numerals or symbols in different embodiments. That is, even if all elements having the same reference numerals are illustrated in a plurality of drawings, the plurality of drawings do not mean one embodiment.

In addition, in this specification and the claims, terms including ordinal numbers such as 'the first' and 'the second' may be used for distinguishing elements. These ordinal numbers are used to distinguish the same or similar elements from one another, and the meaning of terms should not be restrictively interpreted due to the use of such ordinal numbers. As an example, the order of using or the order of arranging elements combined with such ordinal numbers should not be restricted by the numbers. Depending on needs, each ordinal number may be used by being replaced with one another.

In this specification, singular expressions also include plural expressions as long as they do not obviously mean differently in the context. In addition, in the disclosure, terms such as "include" and "consist of" should be construed as designating that there are such characteristics, numbers, steps, operations, elements, components or a combination thereof described in the specification, but not to exclude in advance the existence or possibility of adding one or more of other characteristics, numbers, steps, operations, elements, components or a combination thereof.

Also, in the embodiments of the disclosure, terms such as "a module," "a unit," and "a part" are for referring to elements performing at least one function or operation, and these elements may be implemented as hardware or software, or as a combination of hardware and software. Further, a plurality of "modules," "units," and "parts" may be integrated into at least one module or chip and implemented as at least one processor (not shown), except when each of them needs to be implemented as independent specific hardware.

In addition, in the embodiments of the disclosure, the description that a part is connected with another part includes not only a case of direct connection, but also a case of indirect connection through another medium. Also, the description that a part includes an element means that another element may be further included, but not that another element is excluded, unless there is a particular opposing description.

Hereinafter, various embodiments of the disclosure will be described in detail with reference to the accompanying drawings.

Figure 1:
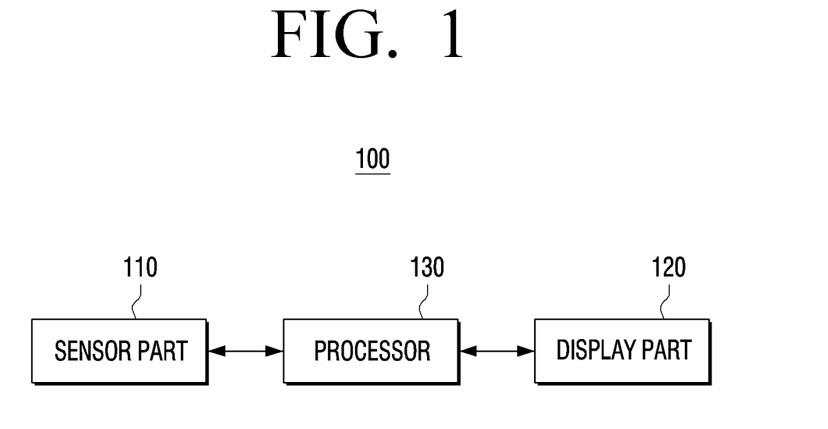
FIG. 1 is a schematic block diagram of an electronic device according to an embodiment of the disclosure.

FIG. 1 is a schematic block diagram of an electronic device according to an embodiment of the disclosure.

The electronic device 100 may be installed inside a vehicle, and it may not only provide information on a moving path to a destination to a driver, but also detect the operation state of the running vehicle and the states of adjacent roads, and provide driving information in accordance thereto to the driver.

Also, the electronic device 100 provides guide information related to driving of a driver by using at least one of the detected driving information, the driving information received from the electronic device 100 of an adjacent vehicle, or traffic information received from a traffic terminal device (not shown) generating a traffic signal, or measuring the speed of a vehicle.

For this, the electronic device 100 may include a sensor part 110, a display part 120, and a processor 130, as illustrated in FIG. 1.

The sensor part 110 acquires driving information detected while a vehicle is running.

Here, the driving information may include infrared ray sensing information for determining the distance between the vehicle of a driver and an adjacent vehicle, speed information, direction information, time information, photographing information which photographed the surrounding environment wherein the vehicle is running, brake pressure information, lane change information, etc.

In addition, the driving information may further include information on the state of the surrounding environment including raindrop detection information, wiper operation information, illuminance information, air pollution information, etc., and the state information of the vehicle including the pneumatic pressure information of the vehicle, vibration strength information, airbag operation information, etc.

The display part 120 provides information on a moving path to a destination that a driver requested. In addition, the display part 120 provides guide information related to driving of the driver.

The processor 130 determines a dangerous event that occurred while the vehicle was running on the basis of the driving information acquired from the sensor part 110. Afterwards, the processor 130 controls the display part 120 to display an image associated with the determined dangerous event on the basis of the information associated with the determined dangerous event among the driving information.

Accordingly, the display part 120 may display an image associated with the dangerous event.

Specifically, in case the driving condition of the vehicle satisfies a predetermined condition on the basis of the driving information acquired from the sensor part 110, the processor 130 determines that a dangerous event occurred.

Here, an image associated with a dangerous event may be an image at the moment when there was a high possibility of occurrence of an accident with an adjacent vehicle or a pedestrian, an image at the moment when the vehicle violated a traffic signal, an image at the moment when the vehicle moved out of the driving lane, an image wherein the vehicle was speeding in a specific zone, an image at the moment when there was a high possibility of occurrence of an accident with an adjacent building, etc.

Also, an image associated with a dangerous event may be a still image or a moving image.

If it is determined that a dangerous event occurred on the basis of driving information as described above, the processor 130 may control the display part 120 to display an image associated with the dangerous event.

According to an embodiment of the disclosure, if it is determined that a dangerous event occurred on the basis of the aforementioned driving information, the processor 130 may control the display part 120 to display an image associated with the dangerous event on the basis of the image at the time point when the dangerous event occurred among the driving images.

Here, a driving image may be an image photographed while the car was running on the basis of photographing information included in the pre-acquired driving information.

According to another embodiment of the disclosure, the processor 130 may generate a simulation image expressing the situation of the time point when the dangerous event occurred on the basis of the aforementioned driving information, and control the display part 120 to display the generated simulation image.

Here, a simulation image may be an image of a first person point of view or an image of a third person point of view.

Meanwhile, the processor 130 may not only acquire driving information through the sensor part 110, but also receive driving information from the electronic device 100 of an adjacent vehicle. Also, the processor 130 may receive traffic information from a traffic terminal device (not shown) generating a traffic signal, or measuring the speed of a vehicle.

In this case, the processor 130 may determine whether a dangerous event occurred on the basis of at least one of the driving information acquired through the sensor part 110, the driving information received from the electronic device 100 of an adjacent vehicle, or the traffic information received from a traffic terminal device (not shown), and provide an image in accordance thereto.

Meanwhile, in the case of receiving driving information from the electronic device 100 of an adjacent vehicle, if a condition associated with a dangerous event is detected, the processor 130 may receive driving information from the electronic device 100 of an adjacent vehicle.

According to an additional aspect of the disclosure, the processor 130 may control the display part 120 to display traffic information associated with a dangerous event and information on safe driving together while displaying an image associated with the dangerous event.

Accordingly, the display part 120 may display traffic information associated with a dangerous event and information on safe driving, together with an image associated with the dangerous event.

Here, traffic information associated with a dangerous event may include information on the penalty and the fine, information on the penalty point, etc. expected for each dangerous event.

Also, information on safe driving associated with a dangerous event may include guide information for safe driving for each situation of a dangerous event.

According to an additional aspect of the disclosure, the processor 130 transmits at least one of an image or traffic information associated with a dangerous event to a traffic management server (not shown). Here, the traffic management server (not shown) may be the server of an organization monitoring traffic situations and controlling and managing the situations, or the server of an insurance company performing post treatments for traffic accidents.

Also, according to an additional aspect of the disclosure, the processor 130 classifies an image associated with a dangerous event by a predetermined category. Afterwards, when a user command is input, the processor 130 may control the display part 120 to display an image classified in a category corresponding to the input user command.

In addition, according to an additional aspect of the disclosure, the processor 130 may determine a driving habit of the driver of a vehicle on the basis of the pre-acquired driving information. Accordingly, the processor 130 may control the display part 120 to display guide information for a driving habit associated with a dangerous event, together with an image associated with the dangerous event.

Accordingly, the display part 120 may display guide information for an image associated with a dangerous event and a driving habit associated with the dangerous event.

Figure 2:
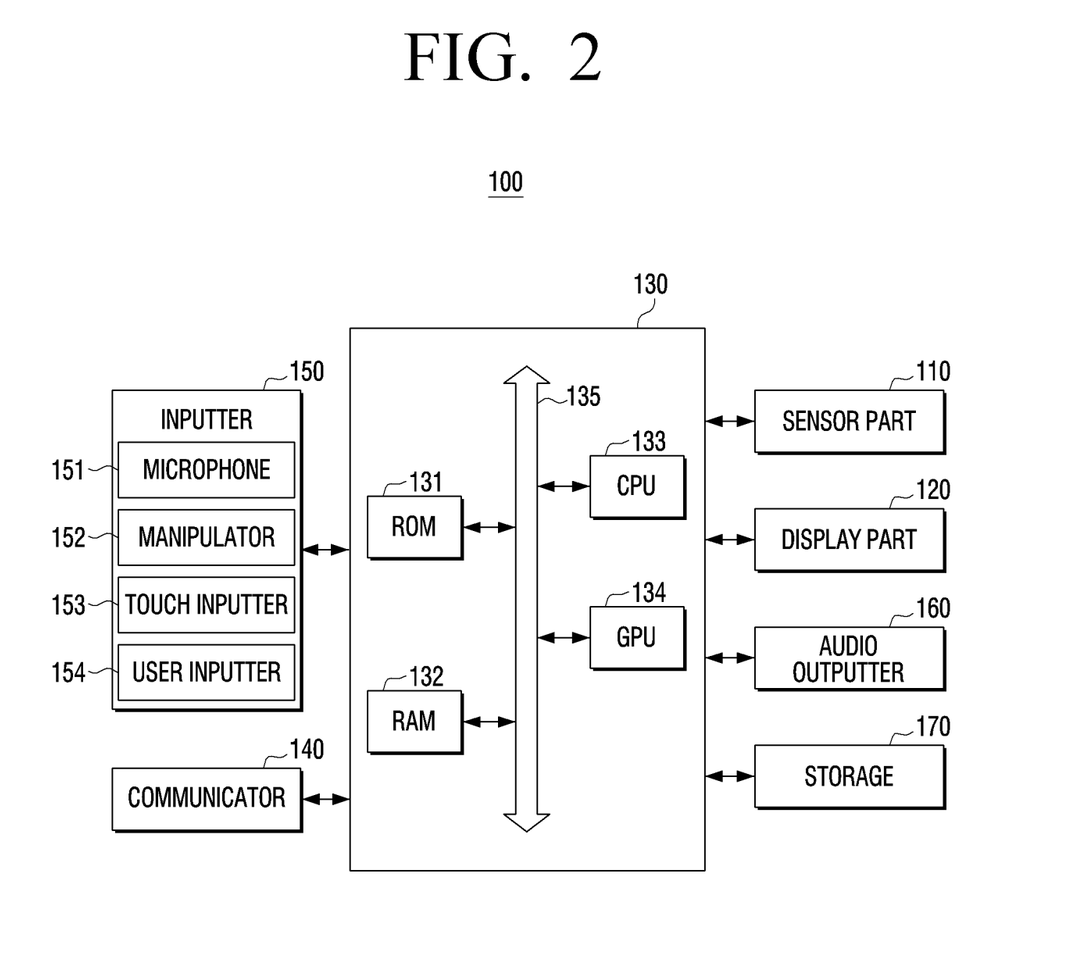
FIG. 2 is a detailed block diagram of an electronic device according to an embodiment of the disclosure.

FIG. 2 is a detailed block diagram of an electronic device according to an embodiment of the disclosure.

The electronic device 100 attached to a vehicle according to the disclosure may further include a communicator 140, an inputter 150, an audio outputter 160, and a storage 170 in addition to the aforementioned components, as illustrated in FIG. 2.

Before describing the components in FIG. 2, the aforementioned sensor part 110 may include a brake pressure sensor, an accelerator pedal sensor, a steering angle sensor, an air pressure sensor, a shock sensor, an acceleration sensor, an infrared ray detection sensor, an image sensor, a raindrop detection sensor, an illumination sensor, an air pollution detection sensor, etc.

The brake pressure sensor is a sensor that detects pressure applied to a brake for reducing the moving speed of a running vehicle, and the accelerator pedal sensor is a sensor that detects pressure applied to an accelerator pedal for increasing the moving speed of a vehicle.

The steering angle sensor is a sensor that detects the angle that a tire rotated in response to the rotating direction of the handle of a vehicle.

The air pressure sensor is a sensor that detects the air pressure state of a tire of a vehicle, and the shock sensor is a sensor that detects the vibration state of a vehicle running on a road.

Meanwhile, the acceleration sensor is a sensor that detects the driving speed of a vehicle, and the infrared ray detection sensor is a sensor that detects the distances from a vehicle to objects in the front, rear, left, and right directions.

Also, the image sensor is a sensor for photographing an image through a camera (not shown), and the raindrop detection sensor is a sensor detecting the amount of rainwater.

Further, the illumination sensor is a sensor for detecting the amount of light, and the air pollution detection sensor is a sensor for measuring the concentration of carbon dioxide ($CO_2$) inside and outside a vehicle.

In addition, the sensor part 110 may further include a geomagnetic sensor for detecting the location of a vehicle, a gravity sensor, a detection sensor detecting lane departure, a proximity sensor detecting whether an adjacent vehicle is close, etc.

As various sensors described above are known technologies, detailed explanation in that regard will be omitted in the disclosure.

The display part 120 displays not only information on the moving path to a destination that a driver requested and guide information related to driving of a driver, but also a control user interface (UI) screen related to driving of a vehicle, as described above. Also, the display part 120 may display image data of a content received from a portable terminal device (not shown) of a driver or a pre-stored content.

The display part 120 as described above may be implemented as a liquid crystal display (LCD), an organic light emitting display (OLED), etc. In particular, in case the inputter 150 that will be described below includes a touch inputter 153 wherein a user's touch input is possible, the display part 120 may be implemented in the form of a touch screen that constitutes an inter-layer structure with the touch inputter 153.

Meanwhile, the communicator 140 illustrated in FIG. 2 performs communication with at least one of a user terminal device (not shown) like a smartphone of a driver, the electronic device 100 of an adjacent vehicle, or a traffic terminal device (not shown) generating a traffic signal, or measuring the speed of a vehicle.

The communicator 140 as described above may be implemented as a communication module such as a near field wireless communication module (not shown) and a wireless communication module (not shown). Here, a near field wireless communication module (not shown) is a communication module performing wireless communication with a user terminal device (not shown) of a driver located in a near distance, and it may be, for example, Bluetooth, Zigbee, near field communication (NFC), etc.

A wireless communication module (not shown) accesses a mobile communication network according to various mobile communication protocols such as WiFi, 3rd Generation (3G), 3rd Generation Partnership Project (3GPP), and Long Term Evolution (LTE), and performs communication with the electronic device 100 of an adjacent vehicle and a traffic terminal device (not shown), etc.

The inputter 150 is an input means for receiving input of various user commands and transmitting them to the processor 130, and may include a microphone 151, a manipulator 152, a touch inputter 153, and a user inputter 154, as illustrated in FIG. 2.

The microphone 151 receives input of voice commands of a user, and the manipulator 152 may be implemented as a key pad including various function keys, number keys, special keys, character keys, etc.

Also, in case the aforementioned display part 120 is implemented in the form of a touch screen, the touch inputter 153 may be implemented as a touch pad constituting an inter-layer structure with the display part 120. In this case, the touch inputter 153 may receive selection commands for icons related to various applications displayed through the display part 120.

The user inputter 154 may receive input of an IR signal or an RF signal for controlling the operation of the electronic device 100 from at least one adjacent device (not shown) like a remote control device.

The audio outputter 160 is a component outputting audio of a content.

Meanwhile, the storage 170 may store map information for guidance of a user's path, path information registered in advance by a user, contents, etc. Also, the storage part 170 may further store a management program for controlling the operation of the electronic device 100. Here, the management program may be a program that is read in the storage 170 in case the electronic device 100 is turned on, and is compiled, and operates each component of the electronic device 100. The storage part 170 as described above may be implemented as at least one of a ROM 131, a RAM 132, a memory card that can be detached from/mounted on the electronic device 100 (e.g., an SD card, a memory stick), a non-volatile memory, a volatile memory, a hard disk drive (HDD), or a solid state drive (SSD) that will be described below.

Meanwhile, the aforementioned processor 130 may be a processing device that controls the overall operations of the electronic device 100 or that makes the overall operations of the electronic device 100 controlled. Such a processor 130 may include a CPU 133, a ROM 131, a RAM 132, and a GPU 134, and the CPU 133, the ROM 131, the RAM 132, and the GPU 134 may be connected with one another through a bus 135.

The CPU 133 accesses the storage 170, and performs booting by using an OS stored in the storage 170. Also, the CPU 133 performs various operations by using various kinds of programs, contents, data, etc. stored in the storage 170.

The GPU 134 generates a display screen including various objects such as icons, images, texts, etc. Specifically, the GPU 134 operates attribute values such as the coordinate values, forms, sizes, colors, etc. by which each object will be displayed according to the layout of the screen based on a received control command, and generates display screens in various layouts including objects based on the operated attribute values.

The ROM 131 stores a set of commands for system booting, etc. When a turn-on command is input and power is supplied, the CPU 133 copies the OS stored in the storage 170 in the RAM 132 according to the command stored in the ROM 131, and boots the system by executing the OS. When booting is completed, the CPU 133 copies various kinds of programs stored in the storage 170 in the RAM 132, and performs various kinds of operations by executing the programs copied in the RAM 132.

The processor 130 as described above may be combined with each of the aforementioned components and implemented as a single chip system (System-on-a-chip or System on chip, SOC, SoC).

Meanwhile, the operations of the aforementioned processor 130 may be performed by programs stored in the storage 170. Here, the storage 170 may be implemented as at least one of a ROM 131, a RAM 132, a memory card that can be detached from/mounted on the electronic device 100 (e.g., an SD card, a memory stick), a non-volatile memory, a volatile memory, a hard disk drive (HDD), or a solid state drive (SSD).

So far, each component of the electronic device 100 according to the disclosure was described in detail. Hereinafter, an operation of providing an image-related service associated with a dangerous event at the electronic device 100 will be described in detail.

Figure 3:
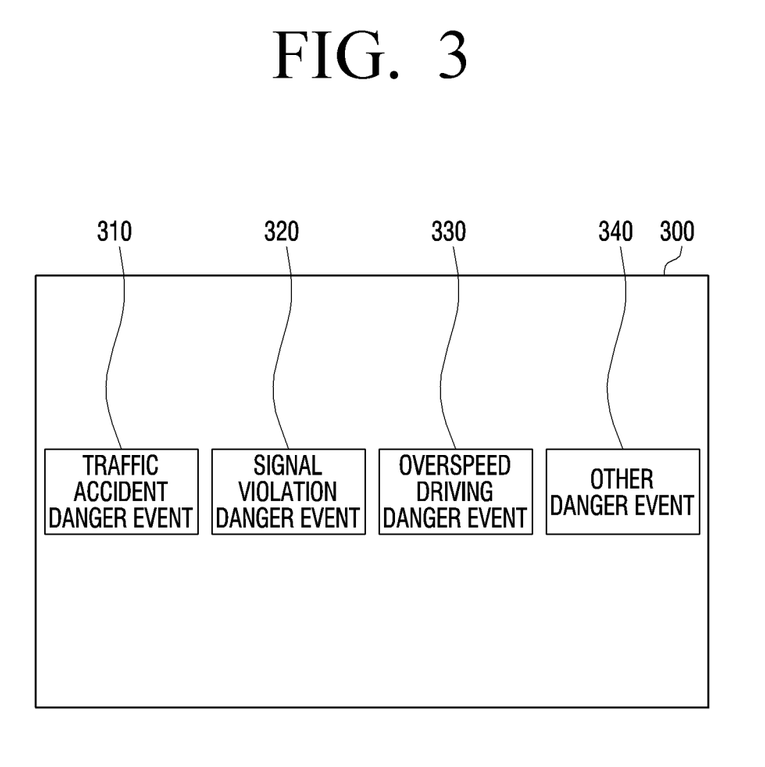
FIG. 3 is an exemplary diagram of providing images for each dangerous event by each category in an electronic device according to an embodiment of the disclosure.
Figure 4:
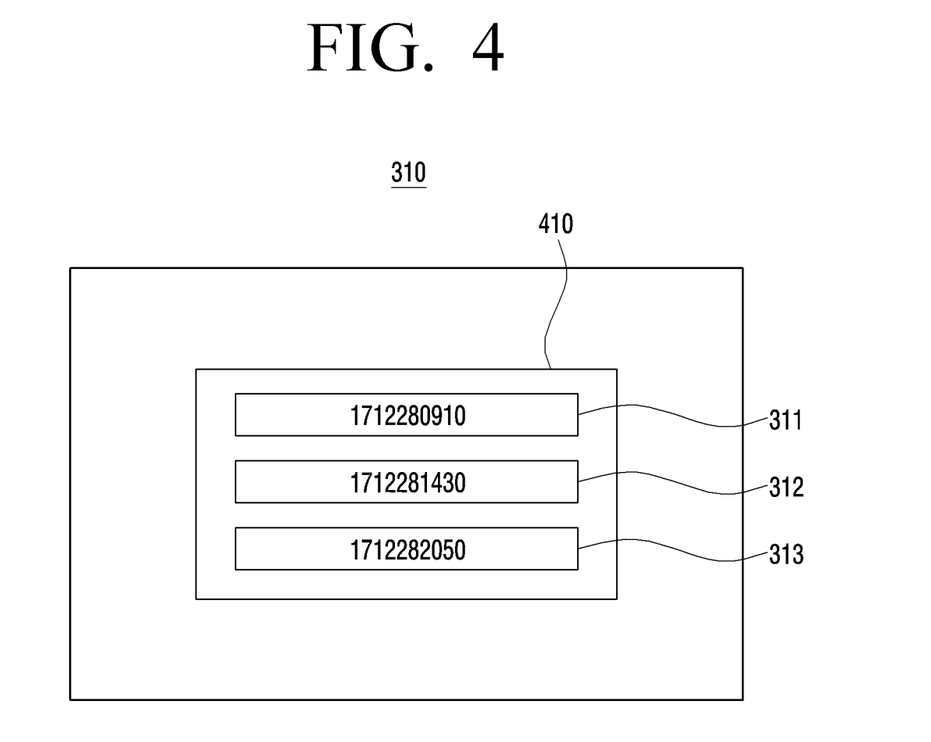
FIG. 4 is an exemplary diagram of providing a list for images divided by categories in an electronic device according to an embodiment of the disclosure.

FIG. 3 is an exemplary diagram of providing images for each dangerous event by each category in an electronic device according to an embodiment of the disclosure, and FIG. 4 is an exemplary diagram of providing a list for images divided by categories in an electronic device according to an embodiment of the disclosure.

As illustrated in FIG. 3, the electronic device 100 may display a dangerous event UI 300 divided by each category.

Specifically, the electronic device 100 may display a dangerous event UI 300 including first to fourth icons 310 to 340 corresponding to each of a traffic accident danger event for providing an image at the moment when there was the highest possibility of occurrence of an accident with an adjacent vehicle or a pedestrian, a signal violation danger event for providing an image at the moment when the vehicle violated a traffic signal, an overspeed driving danger event for providing an image at the moment when the vehicle was speeding in a specific zone, and an other danger event for providing an image at the moment when the vehicle moved out of the driving lane, an image at the moment when there was a high possibility of occurrence of an accident with an adjacent building, etc. on the screen.

Accordingly, the driver may select at least one of the first to fourth icons 310 to 340 displayed on the screen, and the electronic device 100 may display an image for a dangerous event related to an icon selected among the first to fourth icons 310 to 340.

Meanwhile, in case there are a plurality of images for a dangerous event related to a selected icon, the electronic device 100 may display a list including the plurality of images on the screen.

Here, the plurality of images included in the list may be aligned on the basis of the temporal order that each of the plurality of images was generated. That is, the electronic device 100 may align the images in the order of images generated most recently, and display a list in accordance thereto on the screen.

For example, if the first icon 310 for a traffic accident danger event is selected, the electronic device 100 may display a list 410 including the first to third images 311 to 313 classified in a category associated with the traffic accident danger event, as illustrated in FIG. 4.

Here, the first image 311 may be the image generated most recently. Meanwhile, the electronic device 100 may display the dates and time when each of the first to third images 311 to 313 was generated as identification information for each of the first to third images 311 to 313.

Meanwhile, the electronic device 100 may delete an image for a dangerous event classified by each category according to a predetermined condition.

According to an embodiment of the disclosure, the electronic device 100 may provide only an image associated with a dangerous event that occurred on the day, and delete an image associated with a dangerous event occurred previously.

Here, the electronic device 100 may delete only other images excluding an image that a user requested among a plurality of images associated with a dangerous event according to a predetermined condition.

That is, the electronic device 100 may store an image that a user requested among a plurality of images associated with a dangerous event in the storage 170 for a long period.

Figure 5:
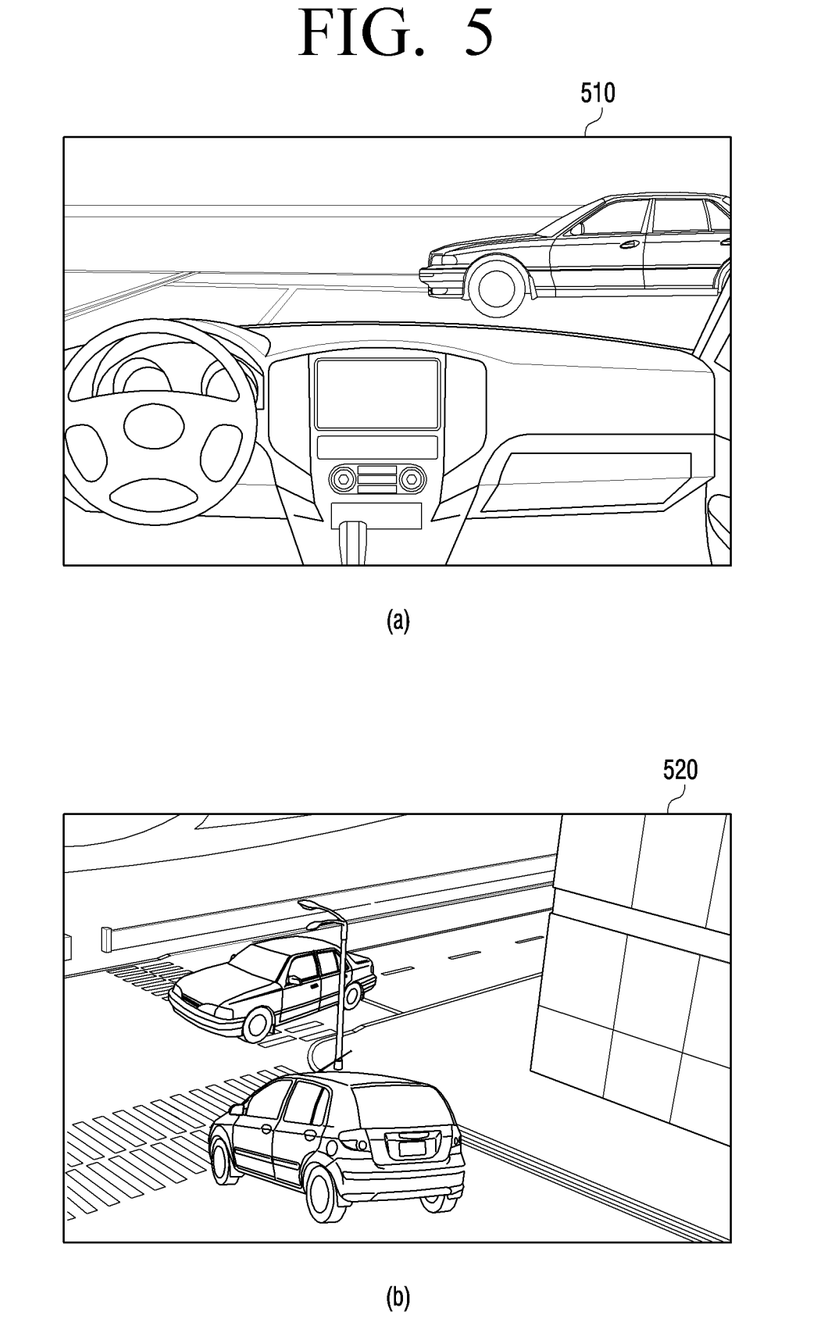
FIG. 5 is an exemplary diagram of providing an image associated with a dangerous event in an electronic device according to an embodiment of the disclosure.

FIG. 5 is an exemplary diagram of providing an image associated with a dangerous event in an electronic device according to an embodiment of the disclosure.

The electronic device 100 may display an image at the time point when a dangerous event occurred on the screen.

Specifically, as illustrated in (a) of FIG. 5, the electronic device 100 may display an image at the time point when a dangerous event occurred as an image of the first type.

Also, as illustrated in (b) of FIG. 5, the electronic device 100 may display an image at the time point when a dangerous event occurred as an image of the second type.

Here, an image of the first type may be an image of a first person point of view of a driver, and an image of the second type may be an image of a third person point of view.

According to an embodiment of the disclosure, in the case of generating an image at the time point when a dangerous event occurred on the basis of an image photographed through a driving record device (not shown) like a black box, the electronic device 100 may generate the image as an image of the first type and display the image.

Meanwhile, in the case of generating a simulation image expressing a situation wherein a dangerous event occurred on the basis of pre-acquired driving information, the electronic device 100 may generate the image as an image of the second type and display the image.

However, the disclosure is not limited thereto, and the electronic device 100 may generate an image associated with a dangerous event as an image of the first type or the second type, according to a user command.

Hereinafter, explanation will be made while specifying that an image generated in association with a dangerous event at the electronic device 100 according to the disclosure is an image of the second type.

Figure 6:
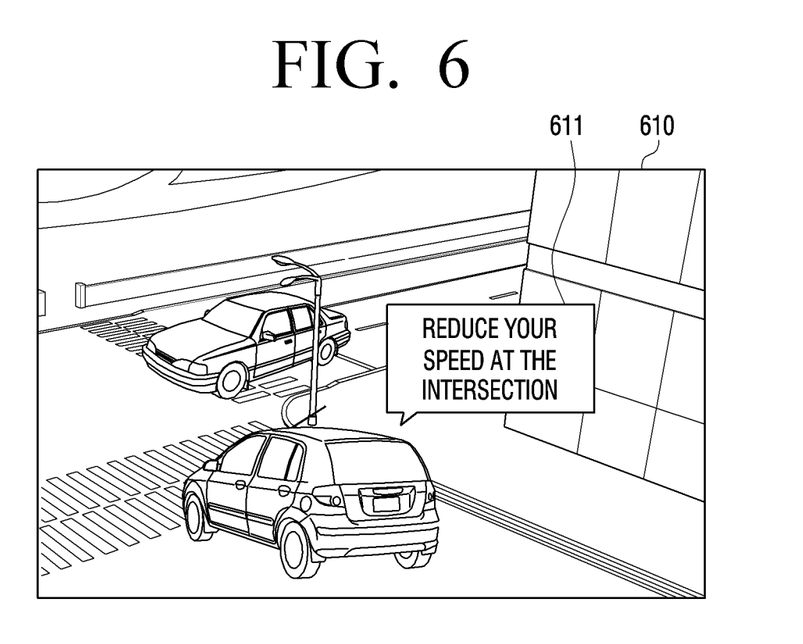
FIG. 6 is an exemplary diagram of providing an image associated with a dangerous event related to a traffic accident in an electronic device according to an embodiment of the disclosure.

FIG. 6 is an exemplary diagram of providing an image associated with a dangerous event related to a traffic accident in an electronic device according to an embodiment of the disclosure.

As illustrated in FIG. 6, the electronic device 100 may display an image 610 at the time point when a dangerous event related to a traffic accident occurred according to a user command.

Specifically, the electronic device 100 may determine whether a dangerous event related to a traffic accident occurred on the basis of driving information acquired through the sensor part 110.

According to an embodiment of the disclosure, the electronic device 100 determines whether an adjacent vehicle is located within a predetermined threshold range based on a driver's vehicle on the basis of infrared ray sensing information included in the pre-acquired driving information.

If it is determined that an adjacent vehicle is located within a predetermined threshold range, the electronic device 100 determines whether the strength of brake pressure exceeds a predetermined threshold strength of pressure on the basis of brake pressure information included in the pre-acquired driving information.

If it is determined, as a result of determination, that the strength of brake pressure exceeds a predetermined threshold strength of pressure, the electronic device 100 determines that a dangerous event wherein there was a high possibility that a traffic accident could occur between the driver's vehicle and an adjacent vehicle located within a predetermined threshold range occurred.

Accordingly, the electronic device 100 may generate a simulation image expressing the situation of the time point when a dangerous event related to a traffic accident occurred on the basis of the pre-acquired driving information.

Afterwards, as illustrated in FIG. 6, the electronic device 100 may display an image 610 expressing the situation of the time point when a dangerous event related to a traffic accident occurred according to a user command.

Here, the electronic device 100 may display a guide UI 611 related to safe driving, which is "Reduce your speed at the intersection," together with the image 610 expressing the situation of the time point when a dangerous event related to a traffic accident occurred.

Figure 7:
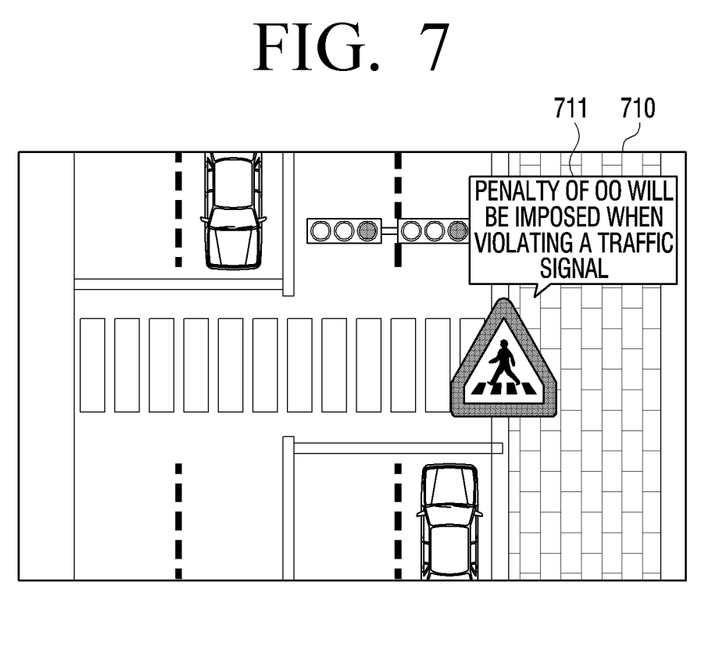
FIG. 7 is an exemplary diagram of providing an image associated with a dangerous event related to violation of a signal in an electronic device according to an embodiment of the disclosure.

FIG. 7 is an exemplary diagram of providing an image associated with a dangerous event related to violation of a signal in an electronic device according to an embodiment of the disclosure.

As illustrated in FIG. 7, the electronic device 100 may display an image 710 at the time point when a dangerous event related to violation of a signal occurred according to a user command.

Specifically, the electronic device 100 may determine whether a dangerous event related to violation of a signal occurred on the basis of driving information acquired through the sensor part 110.

According to an embodiment of the disclosure, the electronic device 100 determines whether there is a pedestrian road (i.e., pedestrian walkway) on the road that a driver's vehicle is running on the basis of photographing information included in the pre-acquired driving information.

If it is determined, as a result of determination, that there is a pedestrian road on the road, the electronic device 100 determines whether the signal of the traffic light related to driving located on the pedestrian road (i.e., pedestrian walkway) is a stop sign (i.e., stop signal) on the basis of the photographing information included in the pre-acquired driving information.

Then, if it is determined, as a result of determination, that the signal of the traffic light is a stop sign (i.e., stop signal), the electronic device 100 determines whether the driver's vehicle passed through the pedestrian road during the stop sign (i.e., stop signal) on the basis of speed information included in the pre-acquired driving information.

Then, if it is determined, as a result of determination, that the driver's vehicle passed through the pedestrian road (i.e., pedestrian walkway) during the stop sign (i.e., stop signal), the electronic device 100 determines that a dangerous event related to violation of a signal occurred.

Accordingly, the electronic device 100 may generate a simulation image expressing the situation of the time point when the dangerous event related to violation of a signal occurred on the basis of the pre-acquired driving information.

Afterwards, as illustrated in FIG. 7, the electronic device 100 may display an image 710 expressing the situation of the time point when the dangerous event related to violation of a signal occurred according to a user command.

Here, the electronic device 100 may display a guide UI 711 related to traffic information, which is "Penalty of 00 will be imposed when violating a traffic signal," together with the image 710 expressing the situation of the time point when the dangerous event related to violation of a signal occurred.

Figure 8:
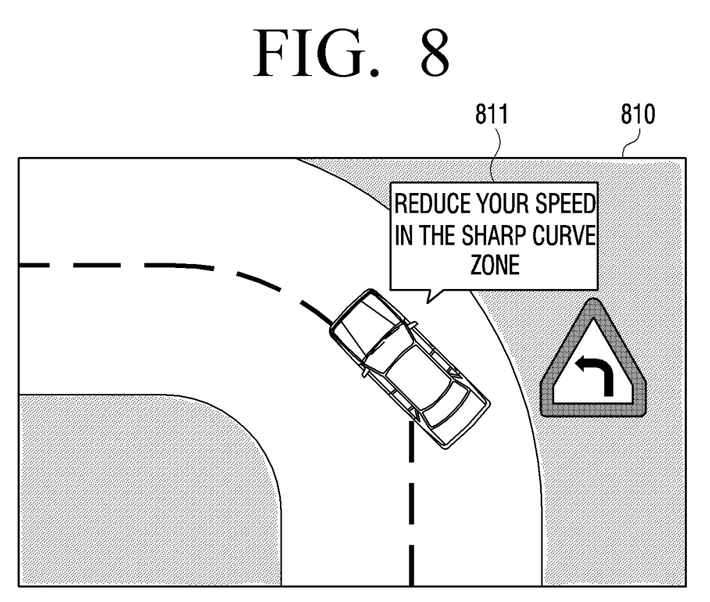
FIG. 8 is an exemplary diagram of providing an image associated with a dangerous event related to overspeed driving in an electronic device according to an embodiment of the disclosure.

FIG. 8 is an exemplary diagram of providing an image associated with a dangerous event related to overspeed driving in an electronic device according to an embodiment of the disclosure.

As illustrated in FIG. 8, the electronic device 100 may display an image 810 at the time point when a dangerous event related to overspeed driving occurred according to a user command.

Specifically, the electronic device 100 may determine whether a dangerous event related to overspeed driving occurred on the basis of driving information acquired through the sensor part 110.

According to an embodiment of the disclosure, the electronic device 100 may analyze photographing information included in the pre-acquired driving information and determine that there is an object associated with a relevant road sign around a sharp curve on the road that a driver's vehicle is running.

As described above, if it is determined that there is an object associated with a relevant road sign around a sharp curve, the electronic device 100 acquires speed information corresponding to the time point when the object associated with a relevant road sign around a sharp curve was photographed among the speed information included in the pre-acquired driving information.

Afterwards, the electronic device 100 determines whether the driver's vehicle ran on the point wherein there is a relevant road sign around a sharp curve at a speed slower than or equal to a predetermined threshold speed on the basis of the acquired speed information.

If it is determined, as a result of determination, that the driver's vehicle ran while exceeding a predetermined threshold speed, the electronic device 100 determines that a dangerous event related to overspeed driving occurred.

Accordingly, the electronic device 100 may generate a simulation image expressing the situation of the time point when the dangerous event related to overspeed driving occurred on the basis of the pre-acquired driving information.

Afterwards, as illustrated in FIG. 8, the electronic device 100 may display an image 810 expressing the situation of the time point when the dangerous event related to overspeed driving occurred according to a user command.

Here, the electronic device 100 may display a guide UI 811 related to safe driving, which is "Reduce your speed in the sharp curve zone," together with the image 810 expressing the situation of the time point when the dangerous event related to overspeed driving occurred.

So far, the operation of providing an image associated with a dangerous event at the electronic device 100 according to the disclosure was described in detail. Hereinafter, a method for providing an image associated with a dangerous event at the electronic device 100 according to the disclosure will be described in detail.

Figure 9:
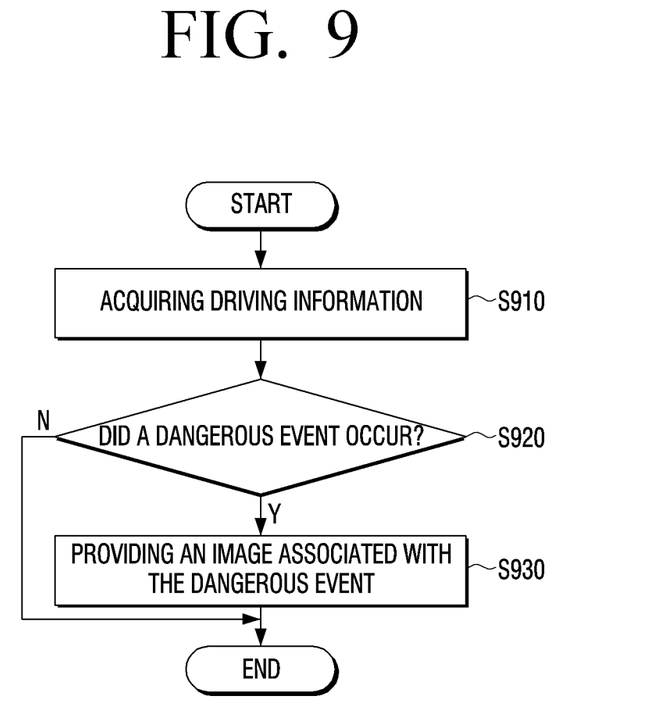
FIG. 9 is a flow chart of a method for providing an image associated with a dangerous event in an electronic device according to an embodiment of the disclosure.

FIG. 9 is a flow chart of a method for providing an image associated with a dangerous event in an electronic device according to an embodiment of the disclosure.

As illustrated in FIG. 9, the electronic device 100 attached to a vehicle acquires driving information from a sensor included in the vehicle while the vehicle is running at operation S910.

Afterwards, the electronic device 100 determines a dangerous event that occurred while the vehicle was running on the basis of the acquired driving information at operation S920.

Specifically, in case the driving condition of the vehicle satisfies a predetermined condition on the basis of the pre-acquired driving information, the electronic device 100 may determine that a dangerous event occurred.

In addition, the electronic device 100 may receive driving information from the electronic device of an adjacent vehicle.

According to an embodiment of the disclosure, the electronic device 100 may perform data communication with the electronic device of an adjacent vehicle that is communicable, and transmit driving information acquired at the electronic device 100 to the electronic device 100 of the adjacent vehicle, and receive driving information acquired from the electronic device 100 of the adjacent vehicle.

According to another embodiment of the disclosure, in case a condition associated with a dangerous event was detected on the basis of the pre-acquired driving information, the electronic device 100 may perform data communication with the electronic device of an adjacent vehicle that is communicable, and receive driving information from the electronic device 100 of the adjacent vehicle.

Through the embodiments as above, in case driving information was received from the electronic device 100 of an adjacent vehicle, the electronic device 100 may determine whether a dangerous event occurred on the basis of the driving information acquired at the vehicle and the driving information received from the electronic device 100 of the adjacent vehicle.

If it is determined that a dangerous event occurred, the electronic device 100 provides an image associated with the dangerous event on the basis of information associated with the determined dangerous event among the pre-acquired driving information at operation S930.

Here, an image associated with a dangerous event may be an image at the moment when there was a high possibility of occurrence of an accident with an adjacent vehicle or a pedestrian, an image at the moment when the vehicle violated a traffic signal, an image at the moment when the vehicle moved out of the driving lane, an image wherein the vehicle was speeding in a specific zone, an image at the moment when there was a high possibility of occurrence of an accident with an adjacent building, etc.

Also, an image associated with a dangerous event may be a still image or a moving image.

Specifically, the electronic device 100 may provide an image associated with a dangerous event according to an embodiment as follows.

According to an embodiment of the disclosure, the electronic device 100 may provide an image associated with a dangerous event on the basis of a driving image which photographed a running scene of a vehicle.

Specifically, the pre-acquired driving information may include a driving image which photographed a running scene of a vehicle. Accordingly, if it is determined that a dangerous event occurred, the electronic device 100 may acquire an image associated with the dangerous event based on the image at the time point when the dangerous event occurred, and provide the acquired image as an image associated with the dangerous event.

According to another embodiment of the disclosure, the electronic device 100 may generate a simulation image expressing the situation of the time point when a dangerous event occurred on the basis of the pre-acquired driving information, and provide the generated simulation image as an image associated with the dangerous event.

Here, a simulation image may be an image of a first person point of view or an image of a third person point of view.

Specifically, driving information may include at least one of the location information, direction information, speed information, or time information of a vehicle. Accordingly, the electronic device 100 may generate a simulation image expressing the situation of the time point when a dangerous event occurred on the basis of various information included in such driving information, and provide the generated simulation image as the image at the time point when the dangerous event occurred.

Meanwhile, the electronic device 100 may classify an image associated with a dangerous event by a predetermined category. Accordingly, if a user command is input, the electronic device 100 may provide an image classified in the category corresponding to the input user command.

According to an additional aspect of the disclosure, the electronic device 100 may provide traffic information related to a dangerous event and information on safe driving together while providing an image associated with the dangerous event.

Also, according to an additional aspect of the disclosure, the electronic device 100 may determine the driving habit of the driver of a vehicle on the basis of the pre-acquired driving information. If such a driving habit is determined, the electronic device 100 may provide guide information for a driving habit associated with a dangerous event together while providing an image associated with the dangerous event.

Meanwhile, the electronic device 100 may transmit at least one of an image associated with a dangerous event or traffic information to a traffic management server (not shown). Here, the traffic management server (not shown) may be the server of an organization monitoring traffic situations and controlling and managing the situations, or the server of an insurance company performing post treatments for traffic accidents.

Meanwhile, the control method for the electronic device 100 as described above may be implemented as at least one execution program, and such an execution program may be stored in a non-transitory computer-readable medium.

A non-transitory computer-readable medium refers to a medium that stores data semi-permanently, and is readable by machines, but not a medium that stores data for a short moment such as a register, a cache, and a memory. Specifically, the aforementioned programs may be stored in various types of recording media that are readable at terminal devices such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, a CD-ROM, etc.

So far, the disclosure was described mainly focused on preferred embodiments thereof.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A control method for an electronic device attached to a vehicle, the method comprising:
   acquiring driving information from a sensor included in the vehicle while the vehicle is running; determining a dangerous event having occurred while the vehicle is running, on a basis of the driving information;
   identifying a category corresponding to the determined dangerous event among the plurality of a predetermined category;
   providing a simulation image expressing a situation of a time point when the dangerous event occurred, on the basis of an information associated with the determined dangerous event from among the driving information and the identified category of the determined dangerous event,
   wherein the providing the simulation image comprises at least one of:
   based on identifying the dangerous event on the basis of an image photographed through a driving record device, providing the simulation image of a first person point of view of a driver, and
   based on identifying the dangerous event on the basis of pre-acquired driving information, providing the simulation image of a third person point of view; and
   providing guide information for a driving habit of the driver associated with the dangerous event while the simulation image is provided.

2. The control method of claim 1, wherein the determining comprises based on a driving condition of the vehicle satisfying a predetermined condition on the basis of the driving information, determining that the dangerous event occurred.

3. The control method of claim 1, wherein the providing comprises providing traffic information associated with the dangerous event and information on safe driving together while providing the simulation image associated with the dangerous event.

4. The control method of claim 3, further comprising:
   transmitting at least one of the simulation image or the traffic information associated with the dangerous event to a traffic management server.

5. The control method of claim 1, further comprising:
   classifying the simulation image associated with the dangerous event in a predetermined category,
   wherein the providing comprises, based on a user command being input, providing an image categorized in a category corresponding to the user command.

6. The control method of claim 1, further comprising:
   receiving a driving information from an electronic device of an adjacent vehicle,
   wherein the determining comprises determining a dangerous event on the basis of the driving information acquired from the vehicle and the driving information received from the electronic device of the adjacent vehicle.

7. The control method of claim 6, wherein the receiving comprises based on a condition associated with the dangerous event being detected, receiving driving information from the electronic device of the adjacent vehicle.

8. An electronic device attached to a vehicle comprising:
   a display part;
   a sensor part acquiring driving information detected while a car was running; and
   a processor configured to:
   determine a dangerous event that occurred while the car was running on a basis of the driving information acquired from the sensor part,
   identify a category corresponding to the determined dangerous event among the plurality of a predetermined category,
   control the display part to display a simulation image expressing a situation of a time point when the dangerous event occurred, on the basis of information associated with the determined dangerous event from among the driving information and the identified category of the determined dangerous event,
   based on identifying the dangerous event on the basis of an image photographed through a driving record device, provide the simulation image of a first person point of view of a driver,
   based on identifying the dangerous event on the basis of pre-acquired driving information, provide the simulation image of a third person point of view, and provide guide information for a driving habit of the driver associated with the dangerous event while the simulation image is provided.

9. The electronic device of claim 8, wherein the processor is further configured to:
based on a driving condition of the vehicle satisfying a predetermined condition on the basis of the driving information, determine that the dangerous event occurred.

10. The electronic device of claim 8,
wherein the driving information includes driving images which photographed running scenes of the vehicle, and
wherein the processor is further configured to control the display part to display an image associated with the dangerous event, on the basis of an image at the time point when the dangerous event occurred among the driving images.

11. The electronic device of claim 8, wherein the processor is further configured to control the display part to display traffic information associated with the dangerous event and information on safe driving together while providing the simulation image associated with the dangerous event.

* * * * *